United States Patent
Favre et al.

(10) Patent No.: US 12,394,972 B2
(45) Date of Patent: Aug. 19, 2025

(54) METHOD AND SYSTEM FOR DETERMINING A TRIPPING RANGE OF AN ELECTRICAL CIRCUIT SWITCHING DEVICE

(71) Applicant: Schneider Electric Industries SAS, Rueil Malmaison (FR)

(72) Inventors: Matthieu Favre, Voiron (FR); Bartosz Boguslawski, Grenoble (FR); Costin Vasile, Grenoble (FR)

(73) Assignee: Schneider Electric Industries SAS, Rueil Malmaison (FR)

(*) Notice: Subject to any disclaimer, the term of this patent is extended or adjusted under 35 U.S.C. 154(b) by 215 days.

(21) Appl. No.: 18/370,426

(22) Filed: Sep. 20, 2023

(65) Prior Publication Data
US 2024/0372353 A1    Nov. 7, 2024

(30) Foreign Application Priority Data
Sep. 23, 2022    (FR) .................................. 2209681

(51) Int. Cl.
H02H 3/00    (2006.01)
H02H 1/00    (2006.01)
H02H 3/08    (2006.01)

(52) U.S. Cl.
CPC ............ H02H 3/08 (2013.01); H02H 1/0092 (2013.01)

(58) Field of Classification Search
CPC .. H02H 3/08; H02H 1/0092; H01H 2071/042; H01H 7/04
USPC .......................................................... 361/87
See application file for complete search history.

(56) References Cited

U.S. PATENT DOCUMENTS

| | | | |
|---|---|---|---|
| 11,888,306 B1* | 1/2024 | Arool Emmanuel . | G01J 5/0096 |
| 2012/0197556 A1 | 8/2012 | Manoosingh et al. | |
| 2022/0376481 A1* | 11/2022 | Kraynov ............... | H02B 11/133 |

OTHER PUBLICATIONS

Nicolaou, Christina et al., "On-site Online Condition Monitoring of Medium-Voltage Switchgear Units", 11th International Conference on the Internet of Things (IoT '21), Nov. 8-12, 2021, 8 pages.
(Continued)

Primary Examiner — Sean Kayes
Assistant Examiner — Lucy M Thomas
(74) Attorney, Agent, or Firm — Troutman Pepper Locke LLP

(57) ABSTRACT

A method and system for determining a tripping range of an electrical circuit switching device designed to supply power to an electrical installation. The system includes an electronic calculation module which is configured to receive data from at least one vibration sensor integrated into said switching device and which is configured to select, based on spectrograms calculated from temporal vibration signals acquired, a predetermined subset of operational characteristics; apply a prediction model parameterized by supervised machine learning to the values of the operational characteristics so as to obtain an estimated value of cut-off current, and determine, as a function of the estimated value of cut-off current, a tripping range of the switching device amongst: normal tripping, overload tripping, and tripping following a short circuit.

10 Claims, 5 Drawing Sheets

(56) References Cited

OTHER PUBLICATIONS

Sun, Shuguang et al., "Fault Diagnosis of Conventional Circuit Breaker Contact System Based on Time-Frequency Analysis and Improved AlexNet", IEEE Transactions on Instrumentation and Measurement, vol. 70, 2021, 12 pages.

Ma, Suliang et al., "High-Voltage Circuit Breaker Fault Diagnosis Using a Hybrid Feature Transformation Approach Based on Random Forest and Stacked Autoencoder", IEEE Transactions on Industrial Electronics, vol. 66, No. 12, Dec. 2019, pp. 9777-9788.

French Search Report and Seach Opinion dated Apr. 11, 2023 for corresponding French Patent Application No. FR2209681, 10 pages.

\* cited by examiner

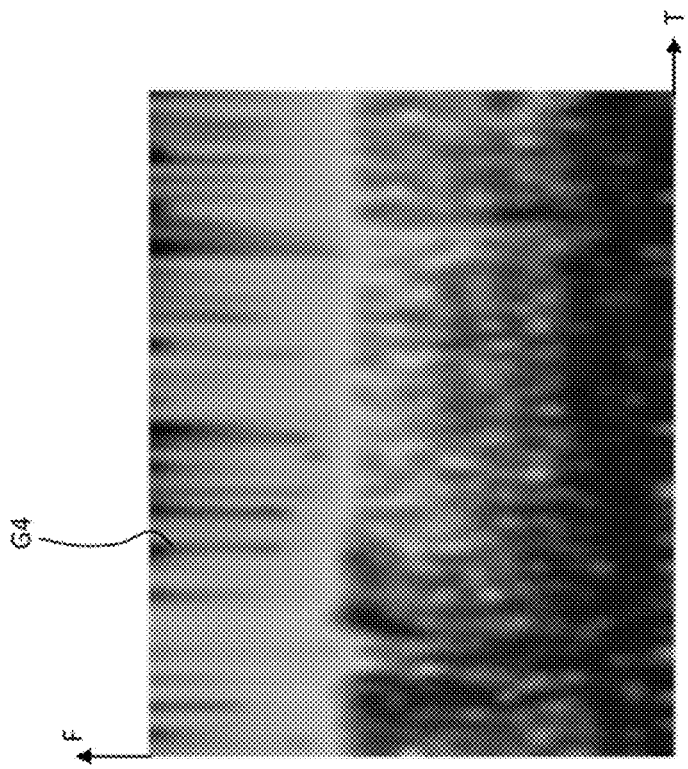
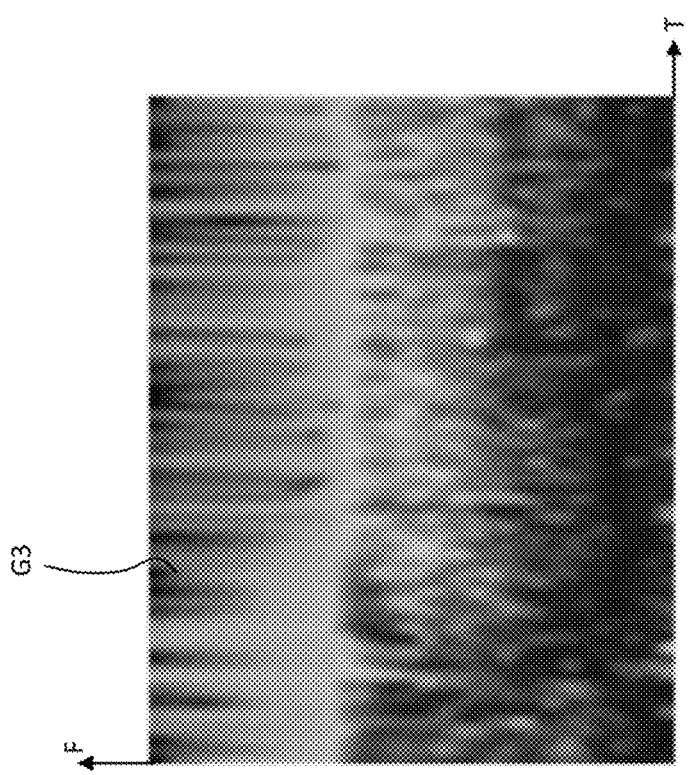
FIG. 3

METHOD AND SYSTEM FOR DETERMINING A TRIPPING RANGE OF AN ELECTRICAL CIRCUIT SWITCHING DEVICE

TECHNICAL FIELD

The present invention relates to a method and a system for determining a tripping range of an electrical circuit switching device.

The invention pertains to the field of safety in electrical installations, and in particular to that of cutting the electric power, commonly called breaking, if there is an electrical fault present in an installation.

BACKGROUND

As is known, various faults can arise in an electrical installation, supplied with power by an electricity supply network, and can endanger the safety of equipment connected in the installation, or even in some cases cause a fire risk or physical danger for an operator.

The safety of electrical installations is ensured by using switching devices, commonly called circuit breakers, that are configured to cut the power very rapidly following a detection of current above a nominal current threshold.

Conventionally, a switching device comprises fixed and moving contacts, the moving contact being designed to move between an open position, in which it is separated from the fixed contact, and therefore the flow of electric current is cut off, and a closed position, in which the moving contact bears against the fixed contact and the flow of electric current is possible. The switching device also comprises a switching trip mechanism, which causes the contacts of the switching device to change over to the open position, and a reset lever.

The reset lever is generally accessible to an operator on a face of the case that contains the switching device, and can be moved between three positions, which are, respectively: an "open" position (corresponding to the open position of the contacts), a "tripped" position, corresponding to opening of the contacts following a breaking action, and a "closed" position (corresponding to the closed position of the contacts). The lever is changed over from the "open" position to the "closed" position, and vice versa, manually by an operator, and changeover from the "closed" position to the "tripped" position is caused automatically by the triggering of a switching action.

Compact moulded case circuit breakers, are also called MCCBs, comprising a magnetothermal module are known in particular. The thermal protection triggers a power cut in the event of the electrical circuit being overloaded. The magnetic protection triggers rapid switching of the electrical circuit in the event of a fault on a load that gives rise to a short-circuit current.

One of the problems that arises for such switching devices is knowing what caused the cutting of the electric power to be triggered.

In particular, it is useful to know when the lever is in the "tripped" position, if the cause of the tripping is an overload fault or a short-circuit fault, because the corrective measures to be taken, and the safety risks for the operator, differ depending on the scenario.

Most switching devices based on a magnetothermal protection module provide no information about the cause of the tripping.

Electronic tripping devices exist that allow identification of the causes of tripping; nevertheless, there is a need to propose a less expensive means of identifying the causes of tripping while proposing a function in addition to the magnetothermal tripping device.

There is therefore a need to determine the tripping range of a switching device so as to be able to indicate said range in order to improve the safety of the electrical installation and of the operator who intervenes following a breaking action.

The tripping ranges respectively comprise:
normal tripping, on control by an operator, for example by operating the lever to change over from a closed position to an open position;
overload tripping, due to the occurrence of an electrical overconsumption by at least one of the loads supplied with power by the electrical installation;
fault tripping, due to the occurrence of an electrical fault, for example a short circuit, in the switching device.

The tripping ranges are associated with cut-off current ranges, which are defined according to the nominal current threshold.

SUMMARY

The aim of the invention is to determine the tripping range of the switching device and to indicate it to the operator.

To this end, the invention proposes, according to one aspect, a method for determining a tripping range of an electrical circuit switching device designed to supply power to an electrical installation comprising at least one load, the switching device having an open position, in which the flow of an electric current in said electrical circuit is cut off, and a closed position, in which an electric current flows in said electrical circuit, changeover from the closed position to the open position being triggered either following a control or following a detection of a cut-off current flowing in said switching device, the cut-off current having a level that exceeds a nominal current threshold.

This method is implemented by an electronic calculation module which is configured to receive data from at least one vibration sensor integrated into said switching device, and it comprises, in an operational phase, steps of:
obtaining at least one temporal vibration signal, over a chosen acquisition period, based on data from said at least one vibration sensor, at a given sampling frequency, following the changeover to said open position,
for each of the temporal vibration signals, transforming the temporal vibration signal into a spectrogram which is represented in a time-frequency representation space,
selecting a predetermined subset of characteristics of the spectrogram, referred to as a subset of operational characteristics,
applying a prediction model parameterized by supervised machine learning, the values of said subset of operational characteristics being provided at the input of said parameterized prediction model so as to obtain a class corresponding to an estimated value of cut-off current,
determining, as a function of the estimated value of cut-off current and said nominal current threshold, a tripping range of the switching device amongst: normal tripping by control, overload tripping following an electrical overconsumption by at least one load of the electrical installation, and tripping following a short circuit.

Advantageously, the proposed method can be used to estimate a cut-off current based on signals obtained by a vibration sensor integrated into the switching device, which allows the tripping range of the switching device to be deduced therefrom.

The method for determining a tripping range according to the invention can have one or more of the features below, taken independently or according to all acceptable combinations.

The determination of a tripping range of the switching device comprises comparing the estimated value of cut-off current with the nominal current threshold, and
- when said estimated value of cut-off current is below the nominal current threshold, the tripping is normal tripping,
- when said estimated value of cut-off current is above the nominal current threshold and below the nominal current threshold multiplied by a predetermined multiplication factor, the tripping is overload tripping, and
- when said estimated value of cut-off current is above the nominal current threshold multiplied by said multiplication factor, the tripping is fault tripping.

The method further comprises displaying an indication relating to the determined tripping range on the human-machine interface of the switching device.

The obtainment of at least one temporal vibration signal comprises applying a time offset of predetermined duration after the tripping of the switching device.

The method comprises a learning phase prior to said operational phase, comprising
- acquiring a plurality of temporal vibration signals, each temporal vibration signal being associated with a known value of cut-off current,
- transforming each temporal vibration signal into a spectrogram and storing said spectrograms and associated values of cut-off currents in a library of learning spectrograms.

The learning phase further comprises a recursive characteristic elimination step, comprising recursively applying steps of:
a) learning the parameters of said prediction model taking, at the input, values of characteristics in a subset of learning characteristics of the calculated spectrograms, said prediction model being parameterized to provide, based on the values of characteristics in said subset of learning characteristics, a classification into a class associated with an estimated value of current,
b) evaluating a significance score, with respect to the result from the prediction model, of each characteristic in said subset of learning characteristics,
c) eliminating the characteristic having the lowest significance score from said subset of learning characteristics,
d) updating the subset of learning characteristics and repeating steps a) to d) until the subset of learning characteristics is empty.

The method further comprises a step of obtaining a ranking of the characteristics by significance rank according to the order of elimination of the characteristics in said subset of learning characteristics and selecting a predetermined number N of the characteristics having the highest significance ranks in order to form the subset of operational characteristics.

The method further comprises optimizing the sampling frequency, the acquisition period and a time offset to be applied when the temporal vibration signals to be processed are obtained.

According to another aspect, the invention relates to a computer program comprising software instructions that, when executed by a programmable electronic calculation module, implement a method for determining a tripping range of an electrical circuit switching device as briefly described hereinabove.

According to another aspect, the invention relates to a system for determining a tripping range comprising a switching device comprising at least one vibration sensor and an electronic calculation module which is configured to implement a method for determining a tripping range as briefly described hereinabove.

Advantageously, the system for determining a tripping range is configured to implement a method for determining a tripping range of an electrical circuit switching device as briefly described hereinabove, according to all the envisaged variants.

BRIEF DESCRIPTION OF THE DRAWINGS

Other features and advantages of the invention will emerge from the description provided therefor hereinbelow, by way of completely nonlimiting indication, with reference to the appended figures, among which:

FIG. 3 shows examples of spectrograms corresponding to the recordings in FIG. 2;

DETAILED DESCRIPTION

Figure 1:
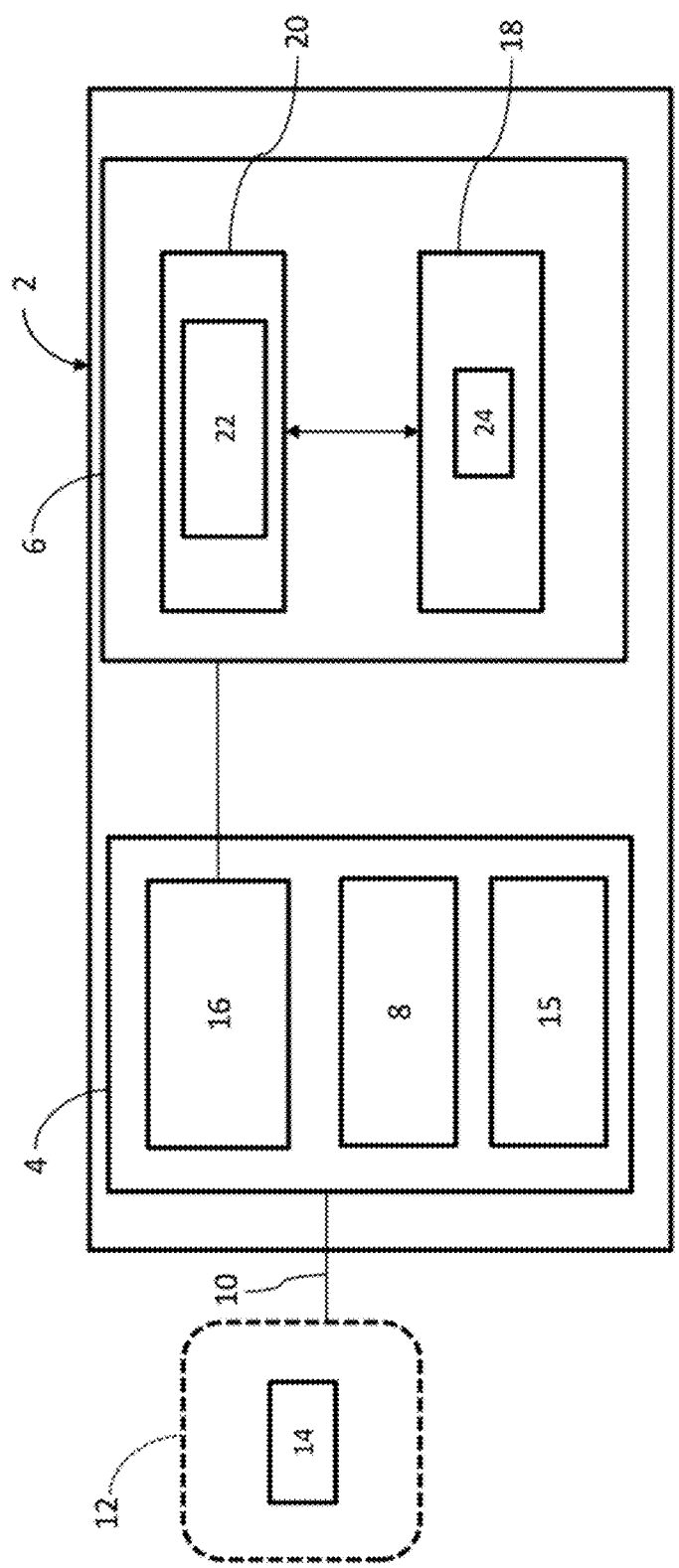
FIG. 1 is a schematic representation of the functional modules of a system for determining a tripping range according to one embodiment.

FIG. 1 schematically shows the main functional blocks of a system 2 for determining a tripping range according to one embodiment.

The system 2 comprises an electrical circuit switching device 4, also called a circuit breaker below, and an electronic calculation module 6.

The circuit breaker 4 comprises a magnetothermal module 8 configured to trip a cut-off for a circuit for supplying electric current, schematically represented by a wire 10, to an electrical installation 12, the electrical installation 12 comprising at least one load 14, and the tripping being performed in the event of overload or electrical fault. The source of electric current is for example a network for supplying three-phase, or single-phase, electric current, which is not shown.

Various embodiments of magnetothermal module 8 are known in the field of devices for cutting electric current (circuit breakers).

In one embodiment, the switching device 4 is a compact device of MCCB ("Moulded Case Circuit Breaker") type, designed to work for currents ranging from 16 amps to 630 amps.

The circuit breaker 4 comprises, besides the magnetothermal module 8, one or more vibration sensors 16.

Preferably, the or each vibration sensor 16 is a 3-axis accelerometer.

Advantageously, the vibration sensor 16 is designed to pick up a signal representing vibrations of the switching device. This is because, in the event of opening being triggered in order to change over from the closed position to the "open" position (e.g. cutting the flow of the electric current in the power supply circuit of the electrical installation), whether as a result of control or as a result of breaking, a mechanical shock is produced that excites the parts of the switching device.

If opening of the switching device 4 is triggered in the event of overload or fault, a shock wave due to the intensity of the switching current arises in addition to this. This shock wave causes additional vibrations, which are superimposed on the mechanical vibrations of the switching device.

The vibration sensor or sensors 16 are preferably positioned close to the magnetothermal module 8.

Preferably, each vibration sensor 16 is positioned so as to be easily mountable on and removable from a new product or an existing product. Advantageously, this allows existing circuit breaker products to be improved.

For example, in the case of a three-phase current, the switching device 4 comprises one vibration sensor 16 for each phase.

Figure 2:
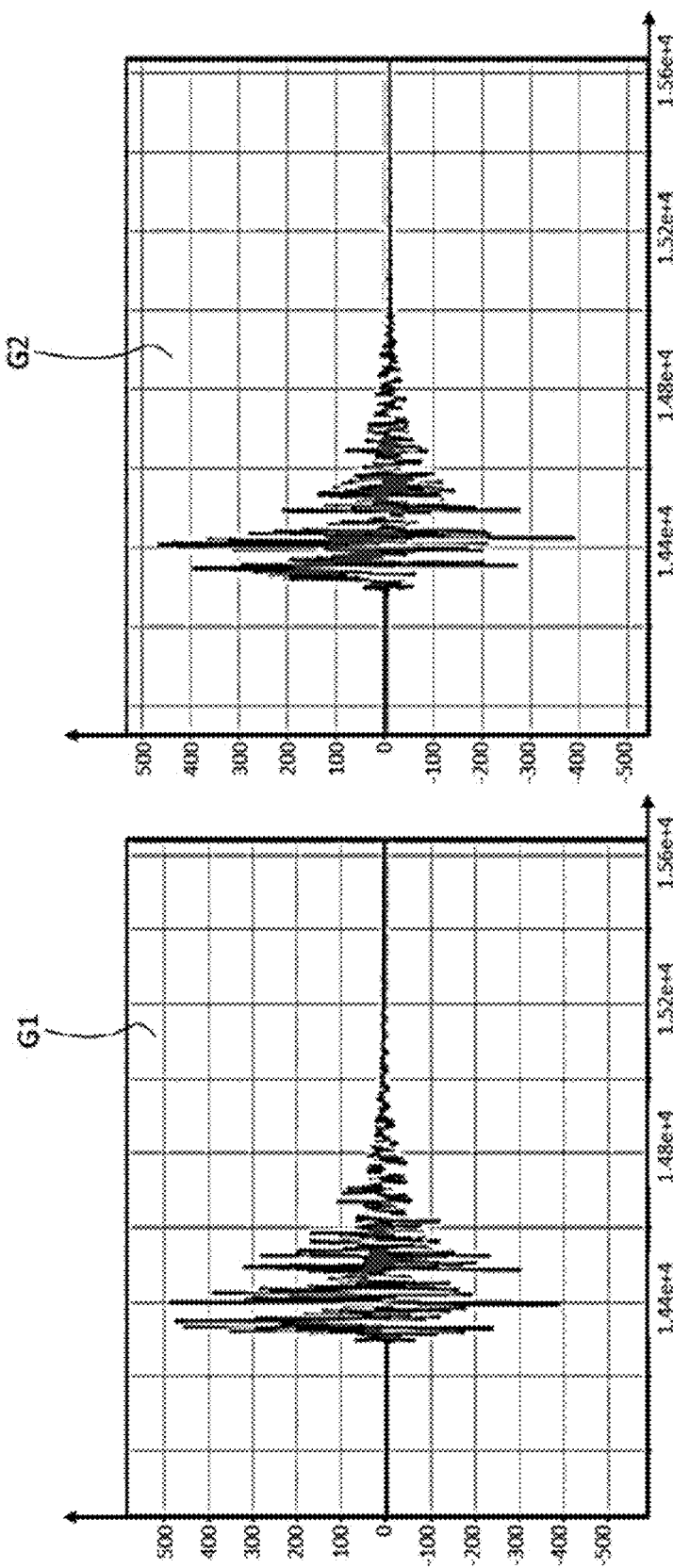
FIG. 2 shows examples of vibration recordings in the time domain for normal tripping and for fault tripping of the switching device.

By way of example, FIG. 2 shows two graphs G1 and G2, respectively corresponding to the case of opening during normal tripping (graph G1) and during fault tripping (graph G2), where the cut-off current is approximately 12×In, $I_n$ being the nominal current threshold.

Each graph G1, G2 shows the curve of the change, in the time domain, in the temporal vibration signal picked up by a vibration sensor, the x-axis representing time expressed in samples (the digits representing the numbers of measurement samples) and the y-axis representing a measured acceleration value expressed in g.

These temporal signals are transformed by applying a discrete Fourier transform in order to obtain spectrograms, in the spectral time-frequency domain.

As can be seen in FIG. 2, the two graphs G1, G2 have similar profiles.

By way of example, FIG. 2 shows two graphs G3, G4, comprising spectrograms shown in the time (x-axis) and frequency (y-axis) domains, respectively corresponding to the curves of graphs G1 and G2 in FIG. 2.

The proposed method implements tools that have been developed to discriminate the tripping ranges and estimate the cut-off current based on the spectrograms of the temporal vibration signals acquired.

Furthermore, the circuit breaker 4 preferably comprises a human-machine interface 15, for example a screen or one or more indicator lights, which can then be used to display the determined tripping range. For example, if the human-machine interface 15 comprises one or more indicator lights, there is provision to light an indicator in a different colour depending on the tripping range, for example green for normal tripping, orange for overload tripping and red for fault tripping.

Advantageously, the indication of the tripping range allows maintenance work to be directed, for example rebalancing loads in the event of an overload or intervening in the electrical installation in the event of a short circuit.

In order to determine the tripping ranges, the electronic calculation module 6 comprises an electronic memory unit 18 and a computation processor 20, which is configured to implement software 22 comprising program instructions that, when executed by the computation processor, carry out a method for determining a tripping range as described hereinbelow.

As a variant, the electronic calculation module 6 is a dedicated module produced in the form of a programmable logic component such as an FPGA (Field Programmable Gate Array), or in the form of a dedicated integrated circuit, such as an ASIC (Application Specific Integrated Circuit).

The electronic memory 18 is designed to store in particular parameters 24 of a prediction model parameterized by machine learning that is designed to provide, based on a subset of spectral characteristics of a vibration signal, an estimate of a value of cut-off current.

In one embodiment, the electronic calculation module 6 is integrated in the same case as the circuit breaker 4, thus forming an electrical circuit switching device configured to self-determine a tripping range for opening an electrical circuit, between normal tripping, overload tripping or electrical fault tripping.

In a variant that is not shown, the electronic calculation module 6 configured to execute the software 22 for determining the tripping range of the circuit breaker 4 is remote from the circuit breaker 4. In this variant, each of the devices 4, 6 further comprises a communication interface designed to communicate according to a given communication protocol, in order to transmit the vibration signals acquired by the vibration sensor to the electronic calculation module, the electronic calculation module 6 transmitting information relating to the determined tripping range for display on the human-machine interface 15.

The method for determining a tripping range of a switching device comprises two phases, which are respectively a preliminary learning phase and an operational phase for determining the tripping range in real time.

For example, the preliminary learning phase is performed for a given category of circuit breakers before they are put into operation in an electrical circuit.

Thus, the preliminary learning phase is performed per category of circuit breakers, the categories being defined by manufacturing specifications.

Figure 4:
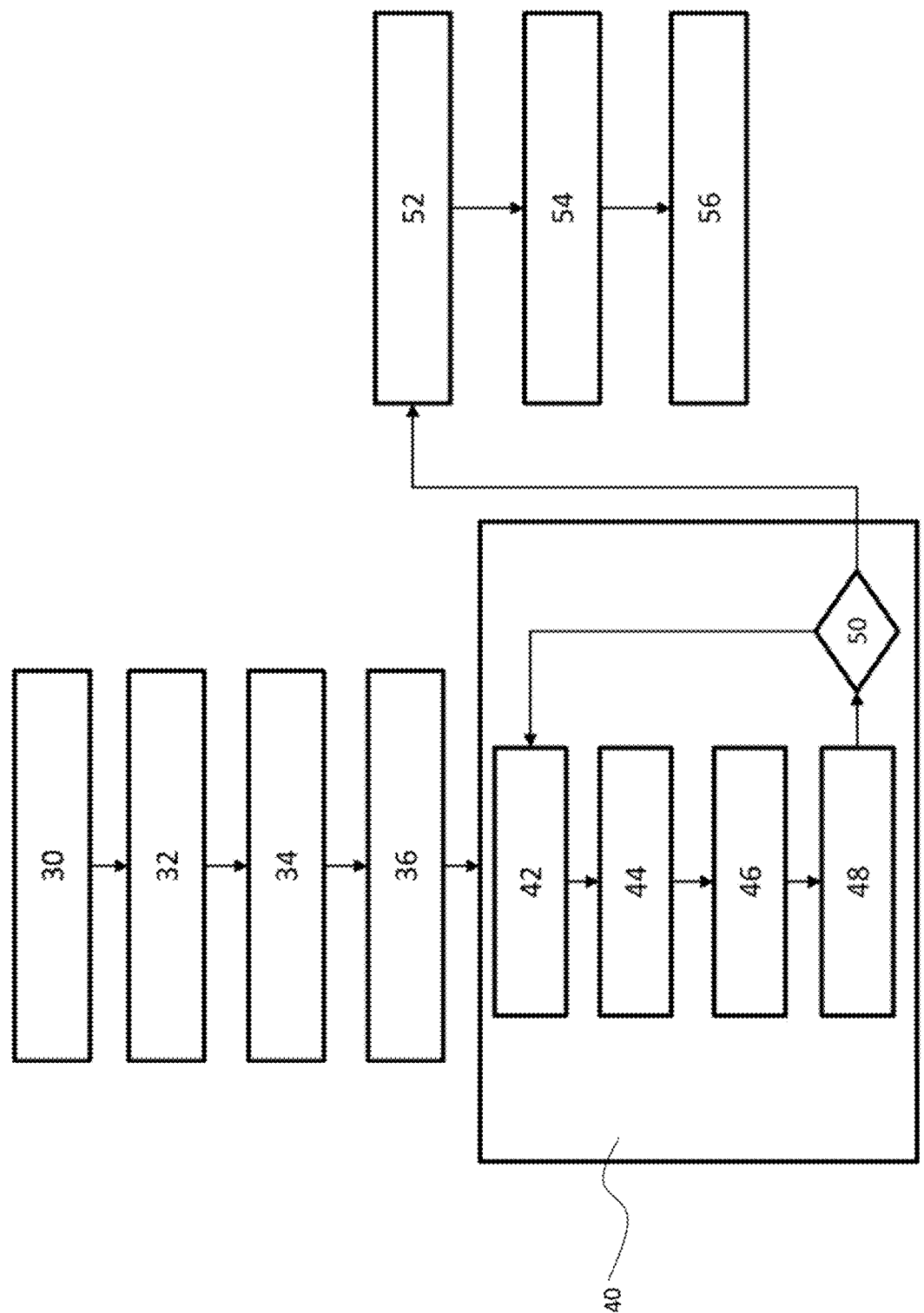
FIG. 4 is an overview of the main steps of a method for determining a tripping range in an operational phase.

FIG. 4 is an overview of the main steps of a method for determining a tripping range of an electrical circuit switching device, in the learning phase.

The method comprises acquiring 30 temporal vibration signals, based on one or more circuit breakers 4, for example a plurality of circuit breakers 4 belonging to a given category of circuit breakers.

If the vibration sensor is a 3-axis accelerometer, each signal is formed from a series of discrete acceleration values recorded at a predetermined sampling frequency. For example, the sampling frequency $F_e$ is between 6.4 kHz and 25.6 kHz, for example equal to 25.6 kHz. In the learning phase, the cut-off current associated with each recorded temporal vibration signal is known, various values of fault and overload current being injected into the circuit breaker for the learning.

Each temporal vibration signal is acquired over a given acquisition period and comprises a number of samples depending on the acquisition period and the sampling frequency.

The acquisition 30 is followed by a step 32 of transforming each of the temporal vibration signals into a spectrogram which is represented in a time-frequency representation space.

The transformation step 32 implements for example a discrete Fourier transform, preferably a Fast Fourier Transform FFT, using the Hanning window. Of course, this is an example, and other windowing variants can be used.

Each column of the spectrogram corresponds to a given time window.

In one embodiment, the method also comprises, optionally, a normalization step 34 in which each column of the spectrogram is normalized with respect to the sum of the values in the column, and then the normalized spectrogram is converted to the logarithmic scale in the scale-changing step 36.

Steps 30 to 36 are repeated for a plurality of given values of cut-off current, making it possible to obtain a library of learning spectrograms, comprising learning spectrograms, each learning spectrogram being associated with a value of cut-off current. The library of learning spectrograms is stored.

Each spectrogram is represented in the form of a matrix of size L×M, comprising values, each value relating to a time index i and to a frequency index j. An element of the spectrogram identified by indices (i,j) is also called a characteristic, each characteristic having an associated value for a given spectrogram.

The method then comprises implementing a recursive characteristic elimination step 40 (recursive feature elimination), which can be used to determine a subset of operational characteristics, which are the characteristics considered most relevant for estimating the cut-off current, by applying a chosen prediction model parameterized by machine learning.

Subset of characteristics is understood to mean a subset of points (k,l) in the representative matrix of the spectrogram.

The recursive characteristic elimination step 40 comprises iterating the following steps, for a chosen prediction model.

The prediction model is a parameterized model, the parameters of which are learnt by supervised machine learning, amongst: support vector machines or SVCs (Support Vector Classifiers), decision tree learning (decision tree classifier), logistic regression, ridge classifier, k-neighbour classifier, bagging classifier, random forest classifier, gradient boosting classification tree or suitable neural networks, such as for example a multilayer perceptron network.

In one embodiment, a linear kernel SVC classifier is implemented.

The recursive characteristic elimination step 40 comprises a step 42 of training the chosen prediction model, in supervised fashion, by providing a subset of values of characteristics of the spectrogram, called a subset of learning characteristics, at the input. Initially, the subset of learning characteristics is equal to all of the characteristics of the spectrogram, i.e. the matrix of size L×M representing the spectrogram.

Applying the prediction model provides, at the output, a class corresponding to an estimate of cut-off current, making it possible to determine a classification into a tripping range amongst the three tripping ranges: normal tripping, overload tripping, or fault tripping, due to the presence of a short circuit in the switching device.

For example, in one embodiment, the prediction model provides at the output a classification into a class amongst C classes, for example C=3 respectively corresponding to the three tripping ranges.

As a variant, the number C of classes is greater than 3, multiple classes of the classification then corresponding to the same tripping range amongst the three tripping ranges listed.

As the nominal current threshold $I_n$ of the implemented circuit breaker is known, the tripping ranges are associated with the level of cut-off current Ic as follows:
normal tripping: cut-off current Ic below In;
overload tripping: cut-off current Ic between In and Q×In;
fault tripping: cut-off current Ic above Q×In,
where Q is a predetermined multiplicative factor, for example Q=10.

As the value of cut-off current Ic that is associated with each spectrogram is known in the learning phase, the parameters of the model are adjusted so that applying the model provides, for each spectrogram, an estimated value of cut-off current that is closest, depending on the chosen classification, to the initial value of cut-off current Ic.

Step 42 is followed by a step 44 of evaluating a significance score associated with each element of the subset of learning characteristics provided at the input with respect to the result of application of the prediction model.

For example, the significance score is obtained by way of statistical correlation, linear model coefficients, decision trees or permutation scores, depending on the prediction model applied.

After step 44 of evaluating the significance score has been applied, the characteristic having the lowest significance score is determined in step 46 and eliminated from the subset of characteristics whose values are provided at the input. The subset of characteristics is then updated in step 48.

Steps 42 to 48 are repeated while there is still at least one characteristic in the updated subset of characteristics (test 50). In particular the training of the chosen prediction model is repeated based on the updated subset of characteristics.

When the updated subset of characteristics is empty, the test 50 is followed by a step 52 of obtaining the classification of the characteristics of the spectrogram for each significance ranking.

The order of elimination of the characteristics provides a classification of the characteristics of the spectrogram, each characteristic having an associated ranking, for example in decreasing order of significance, the characteristic with ranking 1 being the most significant characteristic, which is eliminated last, and the characteristic with the highest ranking being the least significant characteristic, which is eliminated first.

Step 52 is followed by a step 54 of selecting a number N of characteristics that are most significant to the success of the classification. The number N is chosen; preferably N is between 1 and a few thousand, for example between 1 and 4000; more particularly preferably N is equal to 200.

When N is equal to 200, the characteristics having rankings ranging from 1 to 200 are then kept back and form a subset of characteristics that is referred to as the subset of operational characteristics. In other words, it is the N characteristics of the spectrogram that were eliminated last that form the subset of operational characteristics that is selected in selection step 54.

The subset of operational characteristics is stored, in step 54, for example in the form of a table of coordinates (k,l) of each characteristic selected in the spectrogram matrix, or in any other appropriate storage structure.

Advantageously, the selection of a number N of characteristics allows the computation complexity to be reduced.

The method further comprises, optionally, a step of evaluating performance levels 56, for example consisting in calculating a confusion matrix for the library of learning spectrograms, by applying the prediction model trained with the N selected characteristics of the spectrogram, in order to classify spectrograms that have not been used for the training.

In one embodiment, a first percentage, for example 80%, of the spectrograms of the library of spectrograms are used for the training and a second percentage, for example 20%, are used for evaluating performance levels.

According to one variant, all of the spectrograms of the library obtained for multiple instances of a product belonging to the same range (i.e. category of circuit breakers)

except one (instance) are used for the training, the remaining spectrograms (corresponding to an instance that is not used in the training) being used for the evaluation, and the operation being repeated for all of the possible combinations, for example.

Optionally, the method further comprises optimizing the sampling frequency, the signal acquisition period and a time offset period after the switching device has changed over to the open position, various parameters being tested and the performance being evaluated in the classification performance evaluation step 56.

Thus, the inventors have highlighted the possibility of reducing the sampling frequency and the signal acquisition period while preserving good classification performance.

Moreover, advantageously, applying a time offset Δ approximately 20 ms after the tripping of the circuit breaker also allows satisfactory classification performance levels to be obtained.

The parameters of sampling frequency $F_e$, time offset Δ and acquisition period Dt obtained through optimization are stored in order to be used in the operational phase.

Figure 5:
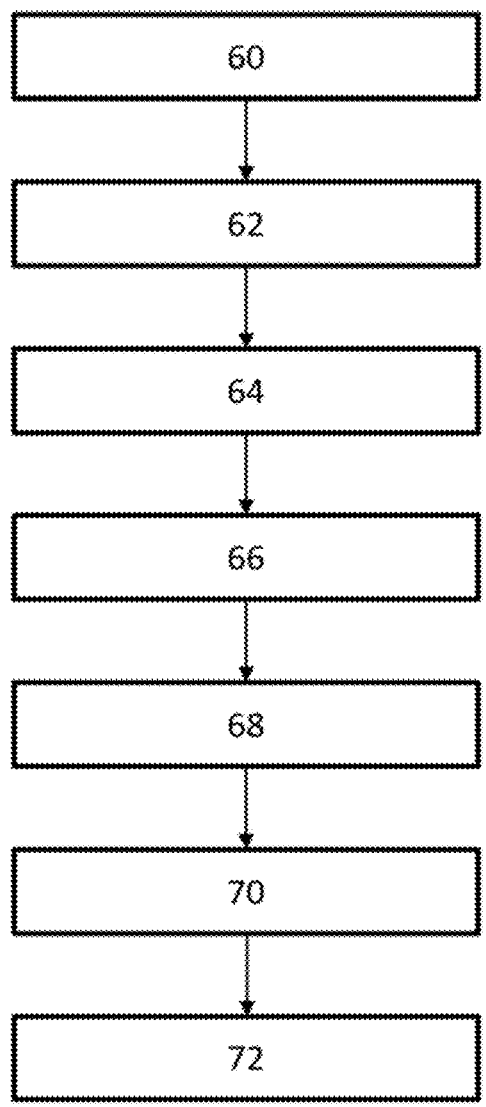
FIG. 5 is an overview of the main steps of a method for determining a tripping range in a learning phase prior to the operational phase.

FIG. 5 is an overview of the main steps of a method for determining a tripping range of an electrical circuit switching device, in the operational phase.

The method comprises a step 60 of acquiring temporal vibration signals, at the previously determined sampling frequency $F_e$, following a vibrational shock for the switching device, corresponding to changeover from the closed position to the open position following a breaking action.

The acquisition 60 is followed by a step 62 of obtaining the temporal vibration signals to be processed, by applying the time offset Δ and acquisition period $D_t$ obtained previously.

If the vibration sensor is a three-axis accelerometer, for each axis, the spectrogram of the signal is calculated in step 64, for example by applying a discrete fast Fourier transform FFT.

Step 64 is followed, for each calculated spectrogram, by the selection 66 of a subset of characteristics of the spectrogram, the subset of characteristics being the subset of operational characteristics previously defined and stored.

For each calculated spectrogram, the values corresponding to said subset of operational characteristics are extracted in step 66 and provided at the input of a step 68 of applying the prediction model parameterized by supervised machine learning, the parameters of which have been adjusted and stored in the previous learning step. In one embodiment, the values corresponding to said subset of operational characteristics are extracted from each spectrogram and combined into an input structure (e.g. vector or matrix) to which the parameterized prediction model is applied.

At the end of step 68, a classification providing an estimate of the value of the cut-off current is obtained, on the basis of the values of the subset of operational characteristics provided at the input, and a tripping range is then determined, in the tripping range determination step 70, by comparing the estimated value of cut-off current Ic with the nominal current threshold In.

More precisely, if Ic is below In, normal tripping by control is involved; if Ic is between In and Q×In, overload tripping is involved; if Ic is above Q×In, fault tripping is involved, the factor Q being equal to 10, for example.

Alternatively, the tripping range is obtained in a single step, the result of the classification performed by the parameterized prediction model being a classification into one of the anticipated tripping ranges.

The tripping range determination step 70 is followed by a step 72 of displaying an indication relating to the determined tripping range on the human-machine interface of the switching device, for example by lighting an indicator light of corresponding colour, according to a previously chosen colour code.

The invention claimed is:

1. A method for determining a tripping range of an electrical circuit switching device designed to supply power to an electrical installation comprising at least one load, the switching device having an open position, in which the flow of an electric current in said electrical circuit is cut off, and a closed position, in which an electric current flows in said electrical circuit, changeover from the closed position to the open position being triggered either following a control or following a detection of a cut-off current flowing in said switching device, the cut-off current having a level that exceeds a nominal current threshold,
the method being implemented by an electronic calculation module which is configured to receive data from at least one vibration sensor integrated into said switching device, the method comprising, in an operational phase:
obtaining at least one temporal vibration signal, over a chosen acquisition period, based on data from said at least one vibration sensor, at a given sampling frequency, following the changeover to said open position,
for each of the temporal vibration signals, transforming the temporal vibration signal into a spectrogram which is represented in a time-frequency representation space,
selecting a predetermined subset of characteristics of the spectrogram, referred to as a subset of operational characteristics,
applying a prediction model parameterized by supervised machine learning, the values of said subset of operational characteristics being provided at the input of said parameterized prediction model so as to obtain a class corresponding to an estimated value of cut-off current,
determining, as a function of the estimated value of cut-off current and said nominal current threshold, a tripping range of the switching device amongst: normal tripping by control, overload tripping following an electrical overconsumption by at least one load of the electrical installation, and tripping following a short circuit.

2. The method according to claim 1, wherein the determination of a tripping range of the switching device comprises comparing the estimated value of cut-off current with the nominal current threshold, and
when said estimated value of cut-off current is below the nominal current threshold, the tripping is normal tripping,
when said estimated value of cut-off current is above the nominal current threshold and below the nominal current threshold multiplied by a predetermined multiplication factor, the tripping is overload tripping, and
when said estimated value of cut-off current is above the nominal current threshold multiplied by said multiplication factor, the tripping is fault tripping.

3. The method according to claim 1, further comprising displaying an indication relating to the determined tripping range on the human-machine interface of the switching device.

4. The method according to claim 1, wherein the obtainment of at least one temporal vibration signal comprises applying a time offset of predetermined duration after the tripping of the switching device.

5. The method according to claim 1, comprising a learning phase prior to said operational phase, comprising
acquiring a plurality of temporal vibration signals, each temporal vibration signal being associated with a known value of cut-off current,
transforming each temporal vibration signal into a spectrogram and storing said spectrograms and associated values of cut-off currents in a library of learning spectrograms.

6. The method according to claim 5, wherein said learning phase further comprises a recursive characteristic elimination, comprising recursively applying:
a) learning the parameters of said prediction model taking, at the input, values of characteristics in a subset of learning characteristics of the calculated spectrograms, said prediction model being parameterized to provide, based on the values of characteristics in said subset of learning characteristics, a classification into a class associated with an estimated value of current,
b) evaluating a significance score, with respect to the result from the prediction model, of each characteristic in said subset of learning characteristics,
c) eliminating the characteristic having the lowest significance score from said subset of learning characteristics,
d) updating the subset of learning characteristics and repeating steps a) to d) until the subset of learning characteristics is empty.

7. The method according to claim 6, further comprising obtaining a ranking of the characteristics by significance rank according to the order of elimination of the characteristics in said subset of learning characteristics and selecting a predetermined number N of the characteristics having the highest significance ranks in order to form the subset of operational characteristics.

8. The method according to claim 5, further comprising optimizing the sampling frequency, the acquisition period and a time offset to be applied when the temporal vibration signals to be processed are obtained.

9. Computer A computer program product comprising a non-transitory computer-readable medium having stored thereon software instructions that, when executed by a programmable electronic calculation module, implement the method according to claim 1.

10. A system for determining a tripping range of an electrical circuit switching device designed to supply power to an electrical installation comprising at least one load, the determination system comprising a switching device having an open position, in which the flow of an electric current in said electrical circuit is cut off, and a closed position, in which an electric current flows in said electrical circuit, changeover from the closed position to the open position being triggered either following a control or following a detection of a cut-off current flowing in said switching device, the cut-off current having a level that exceeds a nominal current threshold, the switching device comprising at least one integrated vibration sensor,
the system comprising an electronic calculation module which is configured to receive data from at least one vibration sensor integrated into said switching device, and configured to implement, in an operational phase, modules for:
obtaining at least one temporal vibration signal, over a chosen acquisition period, based on data from said at least one sensor, at a given sampling frequency, following the changeover to said open position,
for each of the temporal vibration signals, transforming the temporal vibration signal into a spectrogram which is represented in a time-frequency representation space,
selecting a predetermined subset of characteristics of the spectrogram, referred to as a subset of operational characteristics,
applying a prediction model parameterized by supervised machine learning, the values of said subset of operational characteristics being provided at the input of said parameterized prediction model so as to obtain a class corresponding to an estimated value of cut-off current,
determining, as a function of the estimated value of cut-off current and said nominal current threshold, a tripping range of the switching device amongst: normal tripping by control, overload tripping following an electrical overconsumption by at least one load of the electrical installation, and tripping following a short circuit.

* * * * *